United States Patent
Yoon et al.

(10) Patent No.: US 9,930,737 B2
(45) Date of Patent: Mar. 27, 2018

(54) NON-LINEAR ANALOG SIGNAL CONVERSION CIRCUIT CONFIGURED OF PASSIVE ELEMENTS AND LIGHTING APPARATUS USING THE SAME

(71) Applicant: LG INNOTEK CO., LTD., Seoul (KR)

(72) Inventors: Dong Keun Yoon, Seoul (KR); Kwang Ho Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/379,642

(22) Filed: Dec. 15, 2016

(65) Prior Publication Data

US 2017/0171927 A1 Jun. 15, 2017

(30) Foreign Application Priority Data

Dec. 15, 2015 (KR) .......................... 10-2015-0179307

(51) Int. Cl.
*H05B 37/02* (2006.01)
*H05B 33/08* (2006.01)
*H02M 7/06* (2006.01)

(52) U.S. Cl.
CPC .......... *H05B 33/0815* (2013.01); *H02M 7/06* (2013.01); *H05B 33/0845* (2013.01); *H05B 37/02* (2013.01)

(58) Field of Classification Search
CPC ............ H05B 33/0809; H05B 33/0815; H05B 33/0818; H05B 33/0845

(Continued)

(56) References Cited

U.S. PATENT DOCUMENTS

| 2009/0184662 A1* | 7/2009 | Given | H05B 33/0815 315/294 |
| 2010/0301751 A1* | 12/2010 | Chobot | H05B 33/0815 315/86 |

(Continued)

FOREIGN PATENT DOCUMENTS

| JP | 2017-21966 A | 1/2017 |
| KR | 2003-0024433 A | 3/2003 |
| KR | 10-1003686 B1 | 12/2010 |

OTHER PUBLICATIONS

JPO Office Action for Japanese Patent Application No. 2016-243217 dated Sep. 26, 2017 which corresponds to the above-referenced U.S. application.

*Primary Examiner* — Tung X Le

(74) *Attorney, Agent, or Firm* — LRK Patent Law Firm

(57) ABSTRACT

A non-linear analog signal conversion circuit configured of passive elements and a lighting apparatus using the same. The non-linear analog signal conversion circuit includes: an input module for inputting a dimming signal; an inversion module for inverting the dimming signal; a non-linear conversion module for non-linearly converting input power $V_{dc}$ into first output power $V_{o1}$ according to the inverted dimming signal; and a filter module for converting the first output power $V_{o1}$ of an output terminal of the non-linear conversion module into reference power $V_{ref}$ by removing noise of the first output power $V_{o1}$.

19 Claims, 5 Drawing Sheets

(58) Field of Classification Search
USPC .......................................................... 315/297
See application file for complete search history.

(56) References Cited

U.S. PATENT DOCUMENTS

| | | | | |
|---|---|---|---|---|
| 2012/0194091 A1* | 8/2012 | Darshan | ............. | H05B 33/0845 |
| | | | | 315/209 R |
| 2012/0299512 A1* | 11/2012 | Watanabe | .......... | H05B 33/0815 |
| | | | | 315/307 |
| 2013/0300310 A1* | 11/2013 | Hu | ..................... | H05B 33/0854 |
| | | | | 315/239 |
| 2014/0009077 A1* | 1/2014 | Yoshimoto | ......... | H05B 33/0815 |
| | | | | 315/210 |
| 2015/0002049 A1* | 1/2015 | Hu | ..................... | H05B 33/0848 |
| | | | | 315/307 |
| 2016/0323957 A1* | 11/2016 | Hu | ..................... | H05B 33/0854 |
| 2017/0013685 A1* | 1/2017 | Himeda | ............. | H05B 33/0815 |

* cited by examiner

NON-LINEAR ANALOG SIGNAL CONVERSION CIRCUIT CONFIGURED OF PASSIVE ELEMENTS AND LIGHTING APPARATUS USING THE SAME

CROSS REFERENCE TO RELATED APPLICATION

The present application claims the benefit of Korean Patent Application No. 10-2015-0179307 filed in the Korean Intellectual Property Office on Dec. 15, 2015, the entire contents of which are incorporated herein by reference.

BACKGROUND OF THE INVENTION

1. Field of the Invention

The present invention relates to a non-linear analog signal conversion circuit configured of passive elements and a lighting apparatus using the same, the conversion circuit including: an input module for inputting a dimming signal; an inversion module for inverting the dimming signal; a non-linear conversion module for non-linearly converting input power $V_{dc}$ into first output power $V_{o1}$ according to the inverted dimming signal; and a filter module for converting the first output power $V_{o1}$ of an output terminal of the non-linear conversion module into reference power $V_{ref}$ by removing noise of the first output power $V_{o1}$.

2. Description of Related Art

A light emitting diode (LED) is a kind of semiconductor device for converting electrical energy into light. The LED has advantages of low power consumption, semi-permanent lifespan, fast response time, safety and eco-friendliness compared with existing light sources such as a fluorescent lamp, an incandescent lamp and the like. Particularly, an LED lighting apparatus may carry out various performances by controlling the order of turning on and off LEDS installed in a plurality of arrays, colors and brightness of emitted light, and the like.

However, the load characteristic of a lighting unit using such an LED is shown to be non-linear with respect to linear constant voltage. Referring to FIG. 1, since a general dimming signal has a linear characteristic, a microprocessor (microcomputer) for processing the signal should be separately provided to control non-linear output using linear input.

Since the microprocessor for compensating the non-linear characteristic is implemented as a high-performance IC chip, a high-cost design is inevitable, and there exists a possibility of malfunction of software due to inflow of disturbance and noise.

Accordingly, measures for implementing an analog signal conversion circuit are studied in a variety of ways to utilize passive elements having a simple structure to the maximum instead of the microprocessor which controls using digital signals and to accomplish miniaturization and integration of a lighting apparatus.

SUMMARY OF THE INVENTION

Therefore, the present invention has been made in view of the above problems, and it is an object of the present invention to provide a non-linear analog signal conversion circuit configuring a signal processing circuit of passive elements to control non-linear output, and a lighting apparatus using the same.

The technical objects to be accomplished by the present invention are not limited to the technical objects mentioned above, and various technical objects may be included within a scope apparent to those skilled in the art.

To accomplish the above object, according to one aspect of the present invention, there is provided a non-linear analog signal conversion circuit configured of passive elements, the circuit comprising: an input module for inputting a dimming signal; an inversion module for inverting the dimming signal; a non-linear conversion module for non-linearly converting input power $V_{dc}$ into first output power $V_{o1}$ according to the inverted dimming signal; and a filter module for converting the first output power $V_{o1}$ of an output terminal of the non-linear conversion module into reference power $V_{ref}$ by removing noise of the first output power $V_{o1}$.

In addition, in the non-linear analog signal conversion circuit configured of passive elements according to an embodiment of the present invention, the input module inputs a PWM dimming signal.

In addition, in the non-linear analog signal conversion circuit configured of passive elements according to an embodiment of the present invention, the inversion module includes: a first resistor $R_1$ and a first capacitor $C_1$ connected to the input module in parallel; a first switch element $Q_1$ for performing an on/off operation according to the applied dimming signal; and a second resistor $R_2$ and a second capacitor $C_2$ connected to an output terminal of the first switch element in parallel.

At this point, in the non-linear analog signal conversion circuit configured of passive elements according to an embodiment of the present invention, the inversion module further includes: a third resistor $R_3$ connected between the input power $V_{dc}$ and the input module; and a fourth resistor $R_4$ connected between the input power $V_{dc}$ and the output terminal of the first switch element. In addition, the first switch element is any one of FET, BJT and SCR.

In addition, in the non-linear analog signal conversion circuit configured of passive elements according to an embodiment of the present invention, the inversion module inverts a high level and a low level of the dimming signal.

In addition, in the non-linear analog signal conversion circuit configured of passive elements according to an embodiment of the present invention, the non-linear conversion module includes: a second switch element $Q_2$ for performing an on/off operation according to the dimming signal inverted by the inversion module; a fifth resistor $R_5$ connected to an output terminal of the second switch element in series; a sixth resistor $R_6$ connected between the fifth resistor and the output terminal of the non-linear conversion module in series; and a third capacitor $C_3$ connected between the fifth resistor and the sixth resistor in parallel.

At this point, in the non-linear analog signal conversion circuit configured of passive elements according to an embodiment of the present invention, the non-linear conversion module further includes: a seventh resistor $R_7$ connected between the input power and the output terminal of the non-linear conversion module in series; and an eighth resistor $R_8$ connected to the output terminal of the non-linear conversion module in parallel.

In addition, in the non-linear analog signal conversion circuit configured of passive elements according to an embodiment of the present invention, the non-linear conversion module converts the input power into the reference power by equation 1, $$V_{o1} = V_{dc} \frac{(1 - D_{PWM}) + \frac{R_5}{R_8}}{\left(\frac{R_7}{R_8} + \frac{R_7}{R_6} + 1\right)(1 - D_{PWN}) + \frac{R_7 R_5}{R_8 R_6} + \frac{R_5}{R_6}}.$$ [Equation 1]

In addition, in the non-linear analog signal conversion circuit configured of passive elements according to an embodiment of the present invention, the filter module includes: a ninth resistor $R_9$ connected to the output terminal of the non-linear conversion module in series; and a fourth capacitor $C_4$ connected to the ninth resistor in parallel.

In addition, in the non-linear analog signal conversion circuit configured of passive elements according to an embodiment of the present invention, the filter module converts the first output power into the reference power by converting an average value of the first output power into DC power.

In addition, in the non-linear analog signal conversion circuit configured of passive elements according to an embodiment of the present invention, the filter module is a low pass filter for cutting off a high frequency domain of the first output power and passing only a low frequency domain.

In addition, in the non-linear analog signal conversion circuit configured of passive elements according to an embodiment of the present invention, the reference power is applied to a lighting unit to control dimming.

In addition, in the non-linear analog signal conversion circuit configured of passive elements according to an embodiment of the present invention, a cycle $D_{PWM}$ of the dimming signal and power $V_{out}$ of a lighting unit have a non-linear characteristic. In addition, a cycle $D_{PWM}$ of the dimming signal and current $I_{out}$ of a lighting unit have a linear characteristic.

On the other hand, a lighting apparatus according to an embodiment of the present invention includes: a power supply unit for supplying AC power; a converter for converting the AC power into DC power; a lighting unit applied with the DC power to emit light; a dimming signal unit for inputting a dimming signal for controlling the lighting unit; and a signal conversion unit configured of passive elements to generate reference power by non-linearly converting input power according to the dimming signal; and a controller applied with the reference power to control the converter or the lighting unit.

In addition, in the lighting apparatus according to an embodiment of the present invention, the dimming signal unit inputs a PWM dimming signal.

In addition, in the lighting apparatus according to an embodiment of the present invention, the lighting unit increases illuminance as a cycle $D_{PWM}$ of the dimming signal increases. At this point, the cycle $D_{PWM}$ of the dimming signal and the luminance have a linear characteristic.

In addition, in the lighting apparatus according to an embodiment of the present invention, the lighting unit includes: a current regulative diode (CRD); and a light emitting diode (LED).

DETAILED DESCRIPTION OF THE PREFERRED EMBODIMENT

Figure 1:
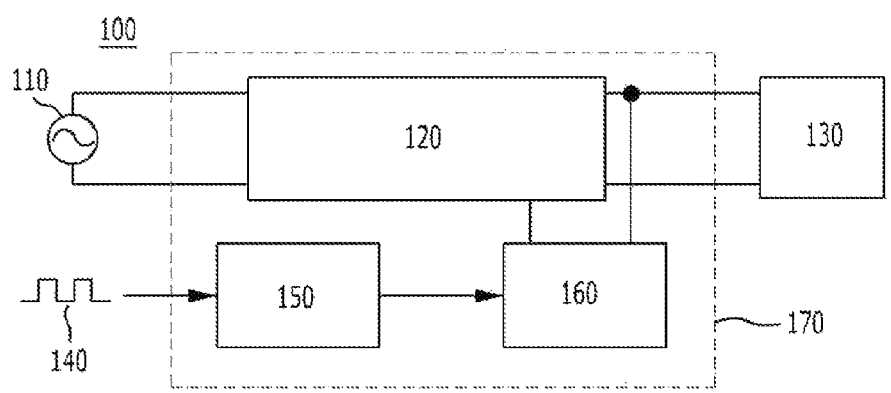
FIG. 1 is a view showing the configuration of a conventional lighting apparatus.

Hereinafter, a 'non-linear analog signal conversion circuit configured of passive elements and a lighting apparatus using the same' according to the present invention will be described in detail with reference to the accompanying drawings. The disclosed embodiments are provided to enable those skilled in the art to easily understand the scope of the present invention, and the present invention is not limited by such embodiments. Moreover, matters illustrated in the drawings are schematized in order to describe or explain the embodiments of the present invention more easily and hence may be different from actually embodied forms.

Meanwhile, the constitutional components expressed below are merely examples for implementing the present invention. Accordingly, other constitutional components may be used in other implementations of the present invention without departing from the spirit and scope of the present invention.

In addition, the expression of 'including' a component is an expression of an 'open type' which merely refers to existence of a corresponding component, and it should not be construed as precluding additional components.

In addition, the expressions such as 'first', 'second' and the like are expressions used only to distinguish a plurality of constitutions and do not limit the sequence or other features of the constitutions.

In addition, the term 'power supply' of the present invention may include all kinds of electrical energy that can be used in a general electrical circuit, such as 'voltage', 'power', 'current' and the like.

FIG. 1 is a view showing the configuration of a conventional lighting apparatus.

Referring to FIG. 1, a conventional lighting apparatus 100 may include an AC power 110, a converter 120, a lighting unit 130, a dimming signal 140, a signal conversion unit 150, a controller 160 and a power supply unit 170.

More specifically, in the conventional lighting apparatus 100, the load characteristic of the lighting unit 130 is shown to be non-linear, and a microprocessor 150 should be separately implemented to control non-linear output using linear input. However, since the microprocessor for compensating the non-linear characteristic is implemented as a high-performance IC chip, a high-cost design is inevitable, and there exists a possibility of malfunction of software due to inflow of disturbance and noise.

To solve the problem of the conventional lighting apparatus, the present invention may implement a miniaturized and integrated lighting apparatus using the signal conversion unit implemented in passive elements, instead of the microprocessor, to control non-linear output using linear input, and thus efficiency of power is enhanced, and standby power is reduced. Details thereof will be described with reference to FIGS. 2 to 6b.

Figure 2:
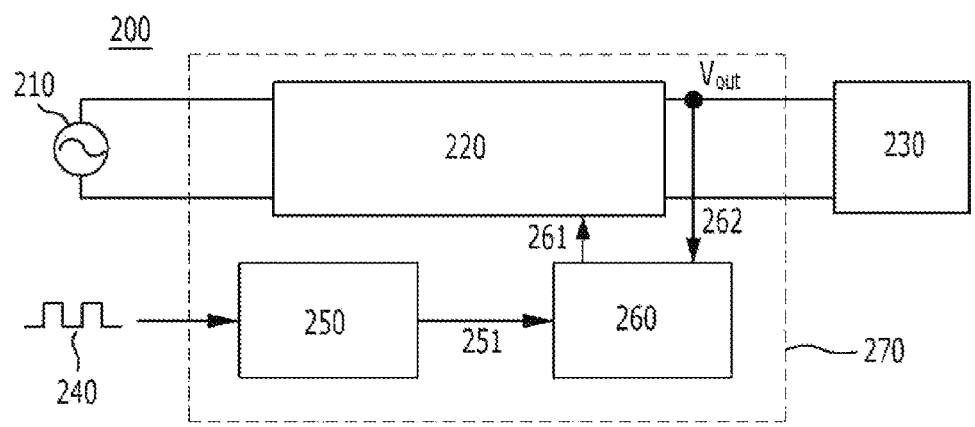
FIG. 2 is a view showing the configuration of a lighting apparatus according to an embodiment of the present invention.

FIG. 2 is a view showing the configuration of a lighting apparatus according to an embodiment of the present invention.

Referring to FIG. 2, a lighting apparatus 200 of the present invention may include a power supply unit 210, a converter 220, a lighting unit 230, a dimming signal unit 240, a signal conversion unit 250 and a controller 260.

The power supply unit 210 supplies AC power. At this point, the power supply unit 210 is preferably a 220V commercial power supply and may have a sine wave form periodically alternating between −311V and +311V in the case of 220V commercial power. More specifically, the power supply unit may perform a function of supplying power to various elements used in the lighting apparatus.

The converter 220 converts AC power into DC power. The converter performs a power control function of receiving main power and converting the main power to supply stable and efficient power requested by the system. Particularly, the converter of the present invention may be implemented as an AC/DC converter for converting AC power to DC power and may perform AC/DC conversion using various rectifying circuits such as a diode rectifier, a phase control rectifier, a bridge rectifier and the like to accomplish desired power conversion while minimizing power loss.

The lighting unit 230 is applied with the DC power and emits light. The converter converts AC power to DC power, and the DC power is supplied to the lighting unit as much as lighting unit power $V_{out}$. Particularly, the lighting unit 230 of the present invention may be configured of a current regulative diode (CRD) 231 and a light emitting diode (LED) 232. Details thereof will be described with reference to FIGS. 5a and 5b.

The dimming signal unit 240 inputs a dimming signal for controlling the lighting unit. Particularly, the dimming signal unit may be used to adjust or change illuminance of the lighting unit and may convert an illuminance control command received from the outside into a dimming signal and input the dimming signal into the power supply apparatus.

In addition, the dimming signal unit may input a PWM dimming signal. The PWM dimming signal refers to a signal of pulse width modulation, which is a method of modulating a cyclic pulse according to an information signal. The pulse width modulation may convert an analog signal, which is a constantly changing physical quantity, into a digital signal and transmit the digital signal by changing the duty cycle according to a ratio of a low level to a high level among the overall level.

Particularly, the dimming signal unit of the present invention controls the lighting unit, and the lighting unit increases illuminance as the cycle $D_{PWM}$ of the dimming signal increases. In addition, the cycle $D_{PWM}$ of the dimming signal and the luminance have a linear characteristic. Details thereof will be described with reference to FIGS. 5a and 5b.

The signal conversion unit 250 is configured of passive elements and generates reference power $V_{ref}$ 251 by non-linearly converting input power according to the dimming signal of the dimming signal unit. The present invention may reduce unit price and miniaturize a power supply product by implementing the signal conversion unit using simple passive elements and switch elements instead of a microprocessor to control non-linear output using linear input. In addition, since the present invention uses passive elements instead of a microprocessor, a power circuit for driving the microprocessor is not needed, and thus efficiency of power is enhanced, and standby power is reduced. Details thereof will be described with reference to FIGS. 3, 4a and 4b.

The controller 260 is applied with the reference power $V_{ref}$ 251 and controls the converter or the lighting unit. Particularly, the controller may be implemented as a constant voltage controller which controls power to be constant and may perform a control operation considering overall characteristic of the system. Particularly, the controller may transmit and receive a feedback signal 261 to and from the converter for control compensation and may confirm and control, in real-time, the lighting unit power $V_{out}$ applied to the lighting unit 230.

Figure 3:
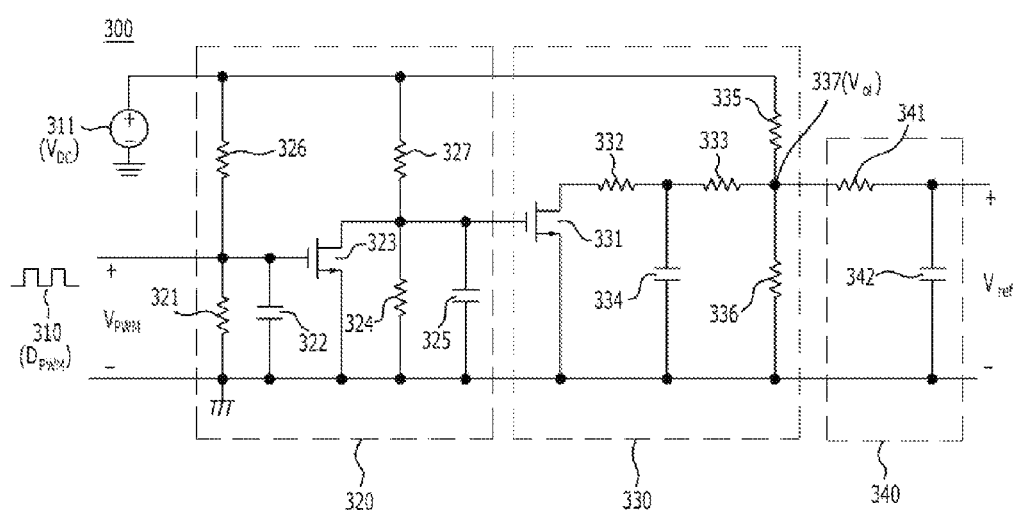
FIG. 3 is a view showing the configuration of a non-linear analog signal conversion circuit configured of passive elements of a lighting apparatus according to an embodiment of the present invention.

FIG. 3 is a view showing the configuration of a non-linear analog signal conversion circuit configured of passive elements of a lighting apparatus according to an embodiment of the present invention.

Referring to FIG. 3, a non-linear analog signal conversion circuit 300 configured of passive elements may include an input module 310, an inversion module 320, a non-linear conversion module 330 and a filter module 340.

A dimming signal is input into the input module 310. The dimming signal may be implemented in a PWM dimming signal as described above, and the input module may receive the dimming signal from the outside to control the lighting unit.

The inversion module 320 may invert the dimming signal. Generally, since the dimming signal is implemented in a digital signal in which a (+) signal and a (−) signal repeatedly appear, the inversion module may invert a (+) signal to a (−) signal when the (+) signal is input and invert a (−) signal to a (+) signal when the (−) signal is input. Particularly, when the dimming signal is implemented in a PWM dimming signal, the high level and the low level of the dimming signal are inverted. For example, if the high level is 5V and the low level is 0V, the high level may be converted to the low level and the low level may be converted to the high level by the inversion module.

More specifically, the inversion module 320 may include a first resistor $R_1$ 321, a first capacitor $C_1$ 322, a first switch element $Q_1$ 323, a second resistor $R_2$ 324, a second capacitor $C_2$ 325, a third resistor $R_3$ 326 and a fourth resistor $R_4$ 327.

The first resistor $R_1$ 321 and the first capacitor $C_1$ 322 are connected to the input module in parallel, and the second resistor $R_2$ 324 and the second capacitor $C_2$ 325 are connected to the output terminal of the first switch element in parallel. At this point, although the input module for inputting the dimming signal is directly connected to the input terminal of the first switch element, the first resistor and the first capacitor may be connected at the input terminal. In addition, the second resistor and the second capacitor may also be directly connected to the output terminal of the first switch element in parallel.

The first switch element $Q_1$ 323 performs an on/off operation according to the applied dimming signal. At this point, the first switch element may be configured of at least any one of FET, BJT and SCR.

Particularly, the first switch element is preferably configured of MOSFET. The gate G terminal of the MOSFET is connected to the input module, and the first switch element may perform the function of a voltage control current source element by applying input power to the gate terminal. In addition, the source S terminal of the MOSFET may be connected to the ground, and the drain D terminal may be connected to the input terminal of the second switch element.

More specifically, if a high-level signal is applied to the gate terminal of the first switch element, the first switch element is turned on, and the signal is converted to a low-level signal at the drain terminal. In addition, if a low-level signal is applied to the gate terminal of the first switch element, the first switch element is turned off, and the signal is converted to a high-level signal at the drain terminal. At this point, the high-level signal refers to a voltage higher than Vth of the MOSFET or BJT, and the low-level signal refers to a voltage lower than Vth of the MOSFET or BJT.

The third resistor $R_3$ 326 is connected between the input power $V_{dc}$ 311 and the input module, and the fourth resistor $R_4$ 327 is connected between the input power $V_{dc}$ 311 and the output terminal of the first switch element. The third resistor and the fourth resistor may be configured to protect components or adjust current when the input power is applied to the first switch element or the second switch element and may be implemented for stabilization of the circuit.

The non-linear conversion module 330 non-linearly converts the input power $V_{dc}$ into first output power $V_{o1}$ according to the inverted dimming signal.

Figure 4A:
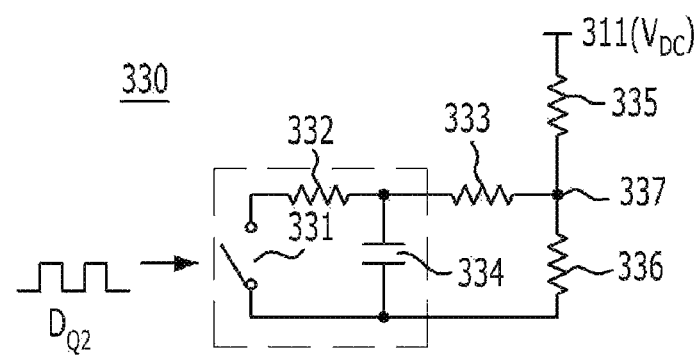
FIGS. 4A and 4B are views showing the configuration a non-linear conversion module of a non-linear analog signal conversion circuit configured of passive elements of a lighting apparatus according to an embodiment of the present invention.

Referring to FIG. 4A, the non-linear conversion module 330 may include a second switch element $Q_2$ 331, a fifth resistor $R_5$ 332, a sixth resistor $R_6$ 333, a third capacitor $C_3$ 334, a seventh resistor $R_7$ 335 and an eighth resistor $R_8$ 336.

The second switch element $Q_2$ 331 receives the inverted dimming signal from the output terminal of the inversion module and performs an on/off operation. At this point, the second switch element may be configured of at least any one of FET, BJT and SCR, like the first switch element. Particularly, the second switch element is preferably configured of MOSFET.

The fifth resistor $R_5$ 332 is connected to the output terminal of the second switch element in series, and the sixth resistor $R_6$ 333 is connected between the fifth resistor and the output terminal of the non-linear conversion module in series.

In addition, the third capacitor $C_3$ 334 is connected between the fifth resistor and the sixth resistor in parallel. At this point, if capacity of the third capacitor is sufficiently large, the voltage charged in the third capacitor is maintained to be constant, and thus the elements may be interpreted after being changed to an equivalent circuit. Particularly, the third capacitor performs a function of maintaining the power applied to both sides of the third capacitor to be a DC value having a very low ripple voltage.

Figure 4B:
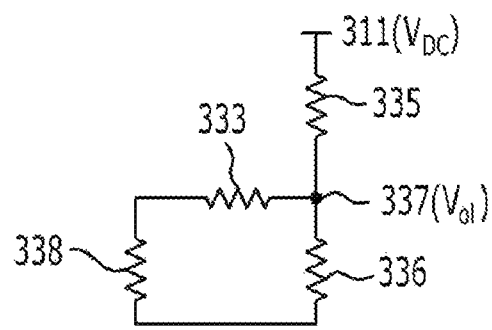

Referring to FIG. 4B, if capacity of the third capacitor is sufficiently large, the second switch element $Q_2$ 331, the fifth resistor $R_5$ 332 and the third capacitor $C_3$ 334 may be expressed as one equivalent resistor $R_5/D_{Q1}$ 338. At this point, $D_{Q1}$ is the cycle of the inverted dimming signal and corresponds to a value $1-D_{PWM}$ inverting the cycle of the dimming signal input into the input module.

The seventh resistor $R_7$ 335 is connected between the input power and the output terminal of the non-linear conversion module in series, and the eighth resistor $R_8$ 336 is connected at the output terminal of the non-linear conversion module in parallel. At this point, the seventh resistor may be configured to protect the components or adjust current when the input power is applied to the second switch element and may be implemented for stabilization of the circuit.

In addition, the non-linear conversion module may convert the input power into a reference voltage according to equation 1 using the various configurations described above. At this point, $V_{o1}$ denotes power 337 of the output terminal of the non-linear conversion module, $V_{dc}$ denotes the input power 311, $D_{PWM}$ denotes a cycle of the dimming signal, $1-D_{PWM}$ denotes a cycle of the inverted dimming signal, $R_5$ denotes the fifth resistor 332, $R_6$ denotes the sixth resistor 333, $R_7$ denotes the seventh resistor 335, and $R_8$ denotes the eighth resistor 336.

$$V_{o1} = V_{dc} \frac{(1 - D_{PWM}) + \frac{R_5}{R_8}}{\left(\frac{R_7}{R_8} + \frac{R_7}{R_6} + 1\right)(1 - D_{PWN}) + \frac{R_7 R_5}{R_8 R_6} + \frac{R_5}{R_6}} \quad \text{[Equation 1]}$$

The filter module 340 converts the first output power $V_{o1}$ of the output terminal of the non-linear conversion module into reference power $V_{ref}$ by removing noise of the first output power $V_{o1}$. At this point, the filter module 340 of the present invention may be configured of an RC filter including a ninth resistor $R_9$ 341 and a fourth capacitor $C_4$ 342.

The ninth resistor $R_9$ 341 is connected to the output terminal of the non-linear conversion module in series, and the fourth capacitor $C_4$ 342 is connected to the ninth resistor $R_9$ 341 in parallel. At this point, if the first output power $V_{o1}$ is applied to the ninth resistor, the first output power $V_{o1}$ is converted into the reference power $V_{ref}$ by way of the ninth resistor and the fourth capacitor.

At this point, the filter module may convert the first output power into the reference power by converting an average value of the first output power into DC power. In addition, the filter module is a low pass filter which cuts off a high frequency domain of the first output power and passes only a low frequency domain. Meanwhile, the reference power free from noise may be applied to the lighting unit to control dimming.

Figure 5A:
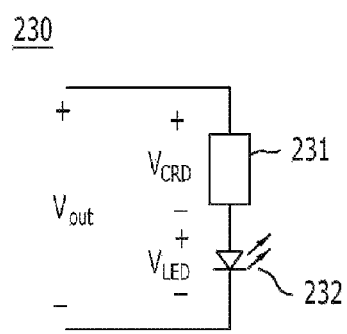
FIG. 5A is a view showing the configuration of a lighting unit of a lighting apparatus according to an embodiment of the present invention.
Figure 5B:
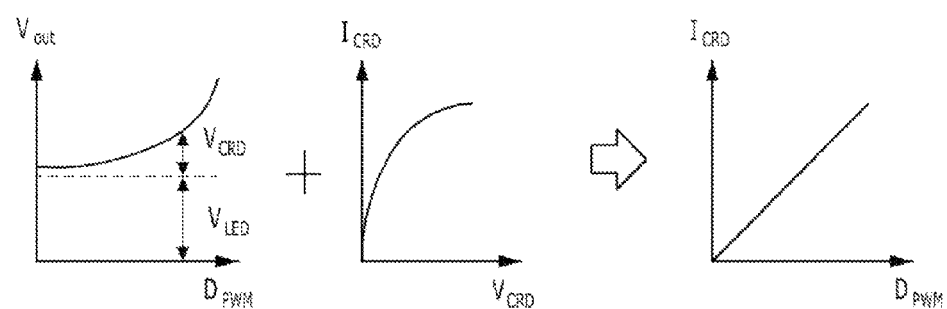
FIG. 5B is a graph showing a degree of a lighting unit of a lighting apparatus according to an embodiment of the present invention proportional to a dimming signal.

FIG. 5A is a view showing the configuration of a lighting unit of a lighting apparatus according to an embodiment of the present invention, and FIG. 5B is a graph showing a degree of a lighting unit of a lighting apparatus according to an embodiment of the present invention proportional to a dimming signal.

Referring to FIG. 5A, the lighting unit 230 of the present invention may include a light emitting diode (LED) 231 and a current regulative diode 232. The signal conversion unit 250 converts the input power into reference power according to the dimming signal, and the reference power may be applied to the lighting unit.

The LED is a light source based on semiconductor, which is a light source generally and widely used as it has various advantages such as low price, long lifespan, small size, eco-friendly waste disposal, low consumption of energy, high efficiency, linearity and the like. However, an LED of a lighting unit has a characteristic of changing brightness greatly according to only a minute change of voltage. More specifically, the current flowing through the LED abruptly increases although the voltage applied to the LED is changed minutely. This will bring instability of LED intensity, reduction of LED lifespan, abnormal heating of a lighting circuit and the like.

The current regulative diode CRD may be used to stabilize the LED. The current regulative diode has a characteristic of supplying constant current of a wide range changing from a low voltage to a high voltage if a forward voltage is applied. Such a current regulative diode may implement the characteristic of constant current, such as a wide operation range of the constant current, a high operation resistance and the like, as a diode and may improve quality of lighting of an LED since the current is limited according to the characteristic of the constant current of the CRD.

In addition, the current regulative diode CRD may simply substitute for a constant current circuit configured of numerous resistors and transistors to be used in a precise sensor signal processing circuit, which requires application fields and reliability, with a small number of components. In addition, the CRD may stabilize the LED by supplying constant current although voltage of the power source is changed and may implement a stable light emitting unit with high brightness and small flickering although a condenser does not supply constant current. In addition, since the current regulative diode controls current at a high temperature, overcurrent or overvoltage of the LED may be prevented, and since heating is distributed, a heat sink apparatus is not required separately.

In addition, the output power $V_o$ applied to the lighting unit may be divided into current regulative diode power $V_{CRD}$ and light emitting diode power $V_{LED}$. As described above, since the voltage-current characteristic and the voltage-cycle characteristic of the current regulative diode power and the light emitting diode power are different from each other, non-linear output may be controlled by linear input using the different characteristics.

Referring to FIG. 5B, the LED current limited by the current regulative diode has a non-linear characteristic with respect to the voltage applied to both sides of the current regulative diode. At this point, since the signal conversion unit of the present invention is configured of passive elements and converts a dimming signal, the cycle $D_{PWM}$ of the dimming signal and the current $I_{CRD}$ of the current regulative diode may be implemented to have a linear characteristic.

Accordingly, the cycle $D_{PWM}$ of the dimming signal and the power $V_{out}$ of the lighting unit have a non-linear characteristic, and the cycle $D_{PWM}$ of the dimming signal and the current $I_{out}$ of the lighting unit have a linear characteristic. In conclusion, the LED current may be controlled by linear analog current for the linear dimming signal cycle.

Figures 6A, 6B:
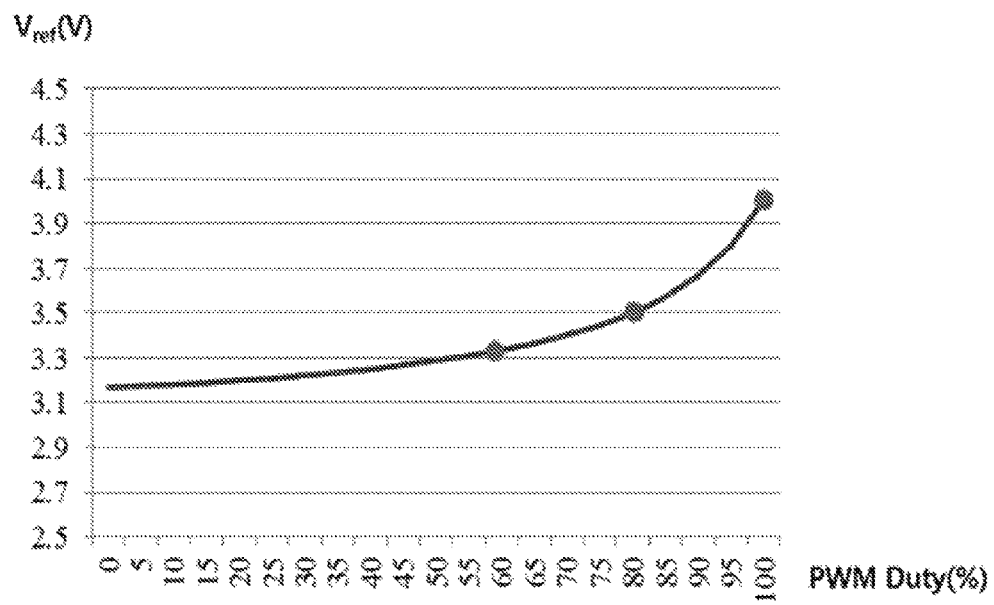
FIGS. 6A and 6B are views showing a degree of proportion between a dimming signal and a reference voltage in a lighting unit of a lighting apparatus according to an embodiment of the present invention.

FIGS. 6A and 6B are views showing a degree of proportion between a dimming signal and a reference voltage in a lighting unit of a lighting apparatus according to an embodiment of the present invention.

Referring to FIGS. 6A and 6B, a relation between the cycle of a dimming signal input into the input module and the reference power may be confirmed. It may be confirmed that when the cycle of the dimming signal increases from 0% to 100%, the reference power also increases from about 3.1V to 4.0V. However, it may be confirmed that the cycle of the dimming signal and the reference power have a non-linear characteristic.

Since the non-linear analog signal conversion circuit configured of passive elements of the present invention and a lighting apparatus using the same are implemented using simple passive elements and switch elements instead of a microprocessor to control non-linear output using linear input, a unit price may be reduced, and a power supply product may be miniaturized.

Further, since the non-linear analog signal conversion circuit configured of passive elements of the present invention and a lighting apparatus using the same use passive elements instead of a microprocessor, a power circuit for driving the microprocessor is not needed, and thus efficiency of power is enhanced, and standby power is reduced.

Further, since the non-linear analog signal conversion circuit configured of passive elements of the present invention and a lighting apparatus using the same control non-linear output using linear input by converting signals without a digital signal process used in a microprocessor, normal control may be maintained without a malfunction when noises and disturbances flow in from the outside.

Further, although a conventional lighting apparatus may cause flickering of a camera and fatigue of eyes since a dimming method using PWM output is used, the non-linear analog signal conversion circuit configured of passive elements of the present invention and a lighting apparatus using the same apply a linear analog dimming method for a lighting unit having a non-linear characteristic, flickering of the camera and fatigue of the eyes may be reduced.

The embodiments of the present invention described above are disclosed for illustrative purposes, and the present invention is not limited thereto. In addition, those skilled in the art may make diverse modifications and changes within the spirit and scope of the present invention, and all the modifications and changes should be regarded as belonging to the scope of the present invention.

What is claimed is:

1. A non-linear analog signal conversion circuit configured of passive elements, the non-linear analog signal conversion circuit comprising:
   an input module for inputting a dimming signal;
   an, inversion module for inverting the dimming signal;
   a non-linear conversion module for non-linearly converting an input power ($V_{dc}$) into a first output power ($V_{o1}$) according to the inverted dimming signal; and
   a filter module for converting the first output power ($V_{o1}$) of an output terminal of the non-linear conversion module into a reference power ($V_{ref}$) by removing noise of the first output power ($V_{o1}$),
   wherein the inversion module includes:
   a first resistor ($R_1$) and a first capacitor ($C_1$) connected to the input module in parallel;
   a first switch element ($Q_1$) for performing an on/off operation according to the applied dimming signal; and
   a second resistor ($R_2$) and a second capacitor ($C_2$) connected to an output terminal of the first switch element in parallel.

2. The non-linear analog signal conversion circuit according to claim 1, wherein the input module inputs a PWM dimming signal.

3. The non-linear analog signal conversion circuit according to claim 1, wherein the inversion module further includes:
   a third resistor ($R_3$) connected between the input power ($V_{dc}$) and the input module; and
   a fourth resistor ($R_4$) connected between the input power ($V_{dc}$) and the output terminal of the first switch element.

4. The non-linear analog signal conversion circuit according to claim 1, wherein the first switch element is any one of FET, BJT and SCR.

5. The non-linear analog signal conversion circuit according to claim 1, wherein the inversion module inverts a high level and a low level of the dimming signal.

6. The non-linear analog signal conversion circuit according to claim 1, wherein the filter module converts the first output power into the reference power by converting an average value of the first output power into DC power.

7. The non-linear analog signal conversion circuit according to claim 1, wherein the filter module is a low pass filter for cutting off a high frequency domain of the first output power and passing only a low frequency domain.

8. The non-linear analog signal conversion circuit according to claim 1, wherein the reference power is applied to a lighting unit to control dimming.

9. The non-linear analog signal conversion circuit according to claim 1, wherein a cycle ($D_{PWM}$) of the dimming signal and power ($V_{out}$) of a lighting unit have a non-linear characteristic.

10. The non-linear analog signal conversion circuit according to claim 1, wherein a cycle ($D_{PWM}$) of the dimming signal and current ($I_{out}$) of a lighting unit have a linear characteristic.

11. A non-linear analog signal conversion circuit configured of passive elements, the non-linear analog signal conversion circuit comprising:
an input module for inputting a dimming signal;
an inversion module for inverting the dimming signal;
a non-linear conversion module for non-linearly converting an input power ($V_{dc}$) into a first output power ($V_{o1}$) according to the inverted dimming signal; and
a filter module for converting the first output power ($V_{o1}$) of an output terminal of the non-linear conversion module into a reference power ($V_{ref}$) by removing noise of the first output power ($V_{o1}$),
wherein the non-linear conversion module includes:
a second switch element ($Q_2$) for performing an on/off operation according to the dimming signal inverted by the inversion module;
a fifth resistor ($R_5$) connected to an output terminal of the second switch element in series;
a sixth resistor ($R_6$) connected between the fifth resistor and the output terminal of the non-linear conversion module in series; and
a third capacitor ($C_3$) connected between the fifth resistor and the sixth resistor in parallel.

12. The non-linear analog signal conversion circuit, according to claim 11, wherein the non-linear conversion module further includes:
a seventh resistor ($R_7$) connected between the input power and the output terminal of the non-linear conversion module in series; and
an eighth resistor ($R_8$) connected to the output terminal of the non-linear conversion module in parallel.

13. The non-linear analog signal conversion circuit according to claim 12, wherein the non-linear conversion module converts the input power into the reference power by equation 1, $$V_{o1} = V_{dc} \frac{(1 - D_{PWM}) + \frac{R_5}{R_8}}{\left(\frac{R_7}{R_8} + \frac{R_7}{R_6} + 1\right)(1 - D_{PWN}) + \frac{R_7 R_5}{R_8 R_6} + \frac{R_5}{R_6}}. \quad \text{[Equation 1]}$$

14. The non-linear analog signal conversion circuit according to claim 12, wherein the filter module includes:
a ninth resistor ($R_9$) connected to the output terminal of the non-linear conversion module in series; and
a fourth capacitor ($C_4$) connected to the ninth resistor in parallel.

15. A lighting apparatus comprising:
a power supply unit for supplying AC power;
a converter for converting the AC power into DC power;
a lighting unit applied with the DC power to emit light;
a dimming signal unit for inputting a dimming signal for controlling the lighting unit;
a signal conversion unit configured of passive elements to generate reference power by non-linearly converting input power according to the dimming signal; and
a controller applied with the reference power to control the converter or the lighting unit,
wherein the signal conversion unit further comprises an inversion module for inverting the dimming signal, and
wherein the inversion module includes:
a first resistor ($R_1$) and a first capacitor ($C_1$) connected to the dimming signal unit in parallel;
a first switch element ($Q_1$) for performing an on/off operation according to the applied dimming signal; and
a second resistor ($R_2$) and a second capacitor ($C_2$) connected to an output terminal of the first switch element in parallel.

16. The lighting apparatus according to claim 15, wherein the dimming signal unit inputs a PWM dimming signal.

17. The lighting apparatus according to claim 15, wherein the lighting unit increases illuminance as a cycle ($D_{PWM}$) of the dimming signal increases.

18. The lighting apparatus according to claim 17, wherein the cycle ($D_{PWM}$) of the dimming signal and the luminance have a linear characteristic.

19. The lighting apparatus according to claim 15, wherein, the lighting unit includes:
a current regulative diode (CRD); and
a light emitting diode (LED).

* * * * *